United States Patent
Yan

(10) Patent No.: US 8,442,211 B2
(45) Date of Patent: May 14, 2013

(54) METHOD AND SYSTEM FOR PROVIDING A RING BACK TONE IN A COMMUNICATION NETWORK

(75) Inventor: Yongfu Yan, Shenzhen (CN)

(73) Assignee: Huawei Technologies Co., Ltd., Shenzhen (CH)

( * ) Notice: Subject to any disclaimer, the term of this patent is extended or adjusted under 35 U.S.C. 154(b) by 956 days.

(21) Appl. No.: 12/425,011

(22) Filed: Apr. 16, 2009

(65) Prior Publication Data

US 2009/0214003 A1   Aug. 27, 2009

Related U.S. Application Data

(63) Continuation of application No. PCT/CN2008/071198, filed on Jun. 5, 2008.

(30) Foreign Application Priority Data

Jun. 30, 2007   (CN) .......................... 2007 1 0076309

(51) Int. Cl.
*H04M 1/00* (2006.01)

(52) U.S. Cl.
USPC ....................................... 379/373.02; 455/433

(58) Field of Classification Search ............. 379/373.01, 379/373.02, 373.03, 373.05, 374.01, 374.02; 455/433
See application file for complete search history.

(56) References Cited

U.S. PATENT DOCUMENTS

| | | | |
|---|---|---|---|
| 8,150,025 B2 * | 4/2012 | Koser et al. | 379/373.02 |
| 2003/0198322 A1 * | 10/2003 | White, Jr. | 379/88.19 |
| 2004/0113605 A1 | 6/2004 | Nishimura | |
| 2005/0243988 A1 * | 11/2005 | Barclay et al. | 379/207.13 |
| 2006/0148459 A1 * | 7/2006 | Wolfman et al. | 455/415 |
| 2006/0153355 A1 | 7/2006 | Wang et al. | |
| 2006/0215829 A1 * | 9/2006 | Schwartz | 379/207.02 |
| 2006/0291640 A1 | 12/2006 | Nagesh et al. | |
| 2007/0003046 A1 | 1/2007 | Batni et al. | |
| 2007/0047523 A1 | 3/2007 | Jiang | |

(Continued)

FOREIGN PATENT DOCUMENTS

| | | |
|---|---|---|
| CN | 1514562 A | 7/2004 |
| CN | 1859493 A | 11/2006 |

(Continued)

OTHER PUBLICATIONS

1st Office Action in corresponding Russian Application No. 2009117301/09 (Oct. 7, 2010).
2nd Office Action in corresponding Chinese Application No. 200710076309.9 (Sep. 14, 2010).

(Continued)

*Primary Examiner* — Olisa Anwah
(74) *Attorney, Agent, or Firm* — Leydig, Voit & Mayer, Ltd.

(57) ABSTRACT

A method and system for implementing an interactive Ring Back Tone service are disclosed, and the method includes: obtaining (S101), when connecting a call, subscription information of an interactive Ring Back Tone service subscribed by a user; issuing (S102), when a called terminal is idle, to the called terminal a first subscription identifier for identifying an interactive Ring Back Tone service subscription of the user, where the first subscription identifier is for instructing the terminal to wait for playing of an interactive Ring Back Tone; and playing (S103), according to the interactive Ring Back Tone service subscribed by the user, the interactive Ring Back Tone to the called user.

4 Claims, 7 Drawing Sheets

U.S. PATENT DOCUMENTS

2007/0064921 A1* 3/2007 Albukerk et al. ........ 379/373.02
2007/0286401 A1* 12/2007 Siddiqui et al. ............... 379/372
2009/0185668 A1* 7/2009 Daloz et al. ................ 379/88.12

FOREIGN PATENT DOCUMENTS

| CN | 1885879 A | 12/2006 |
|---|---|---|
| CN | 101090418 A | 12/2007 |
| KR | 2007-0014923 A | 2/2007 |
| WO | WO 2006/135592 A1 | 12/2006 |

OTHER PUBLICATIONS

State Intellectual Property Office of The People's Republic of China, English Translation of Written Opinion of the International Searching Authority in International Patent Application No. PCT/CN2008/071198 (Sep. 18, 2008).

European Patent Office, Office Action in European Application No. 08757609.6-1237 (Jan. 25, 2012).

* cited by examiner

METHOD AND SYSTEM FOR PROVIDING A RING BACK TONE IN A COMMUNICATION NETWORK

CROSS-REFERENCE TO RELATED APPLICATIONS

This application is a continuation of International Patent Application No. PCT/CN2008/071198, filed Jun. 5, 2008, which claims priority to Chinese Patent Application No. 200710076309.9, filed Jun. 30, 2007, both of which are hereby incorporated by reference in their entirety.

FIELD OF THE INVENTION

The present invention relates to the field of communication, and particularly to a method and system for providing a Ring Back Tone in a communication network.

BACKGROUND OF THE INVENTION

A personalized Ring Back Tone service is typically a service customized by a calling or a called user to provide a user with a euphonic segment of music, a greeting, or a voice recorded and synthesized by the customizer himself, instead of a normal Ring Back Tone. The existing personalized Ring Back Tone service is unidirectional. For example, in a callee Ring Back Tone service, the calling party hears a personalized ring tone customized by the callee, and the called party hears a ring tone made by a phone terminal.

During research, the inventor of the present invention has identified that although the called user may know the phone number of the calling party from an incoming call display, he/she may not be able to determine the identity of the calling party from the ring tone, which frustrates user experience.

SUMMARY OF THE INVENTION

In order to enable a called user to hear a personalized Ring Back Tone instead of a conventional ring tone, a method and system for providing a Ring Back Tone in a communication network is provided according to embodiments of the present invention.

An embodiment of the present invention provides a method for providing a Ring Back Tone in a communication network, which includes: obtaining, when connecting a call, subscription information of an interactive Ring Back Tone service subscribed by a user; issuing, when a called terminal is idle, to the called terminal a first subscription identifier for identifying an interactive Ring Back Tone service subscription of the user, wherein the first subscription identifier is for instructing the called terminal to wait for playing of an interactive Ring Back Tone; and playing, according to the subscription information of the interactive Ring Back Tone service subscribed by the user, the interactive Ring Back Tone to the called user.

An embodiment of the present invention provides a system for providing a Ring Back Tone in a communication network, which includes: a switching device, adapted to issue, when a called terminal is idle, to the called terminal a first subscription identifier, wherein the first subscription identifier is for instructing the called terminal to wait for playing of an interactive Ring Back Tone; to connect a session between the called terminal and an interactive Ring Back Tone service platform; and to instruct the interactive Ring Back Tone service platform to play the interactive Ring Back Tone to the called terminal; wherein the interactive Ring Back Tone service platform is adapted to play, according to subscription information of an interactive Ring Back Tone service subscribed by a user, the interactive Ring Back Tone to the called user.

An embodiment of the present invention further provides a switching device, which includes: an interactive Ring Back Tone subscription information obtaining unit, adapted to obtain subscription information of an interactive Ring Back Tone service subscribed by a user; an interactive Ring Back Tone subscription identifier issuing unit, adapted to issue to a called terminal a first subscription identifier for identifying an interactive Ring Back Tone service subscription of the user, wherein the first subscription identifier is for instructing the called terminal to wait for playing of an interactive Ring Back Tone; and an interactive Ring Back Tone service triggering unit, adapted to route the subscription information of the interactive Ring Back Tone service to an interactive Ring Back Tone service platform to trigger the interactive Ring Back Tone service.

An embodiment of the present invention further provides an interactive Ring Back Tone service platform, which includes: a storing unit, adapted to store service information of an interactive Ring Back Tone service; a receiving unit, adapted to receive subscription information of the interactive Ring Back Tone service transmitted from a switching device; and a playing unit, adapted to play an interactive Ring Back Tone to a user according to the service information and the subscription information of the interactive Ring Back Tone service.

An embodiment of the present invention further provides a terminal, which includes: a receiving unit, adapted to receive a first subscription identifier for identifying an interactive Ring Back Tone service subscription of a user, wherein the first subscription identifier is for instructing a called terminal to wait for playing of an interactive Ring Back Tone; and a shielding unit, adapted to shield, according to the first subscription identifier, its own ring tone.

With the above embodiments of the present invention, it is possible to make full use of personalized Ring Back Tone resources by playing to a caller a personalized Ring Back Tone and at the same time playing to a callee an interactive Ring Back Tone which is a Ring Back Tone set to be played according to the setting of the callee; thereby improving user experience.

DETAILED DESCRIPTION OF THE EMBODIMENTS

Specific implementing process of the technical solutions of the embodiments of the invention and corresponding available advantageous effects thereof are described in detail to make the technical solutions of the embodiments of the invention and their advantages more apparent.

Typically, a called user hears a ring tone transmitted by a called terminal after a calling user calls the called user. With the embodiments of the invention, the called user may hear a personalized Ring Back Tone customized by the calling user or the called user after an interactive Ring Back Tone service has been customized by the calling or the called user.

Figure 1:
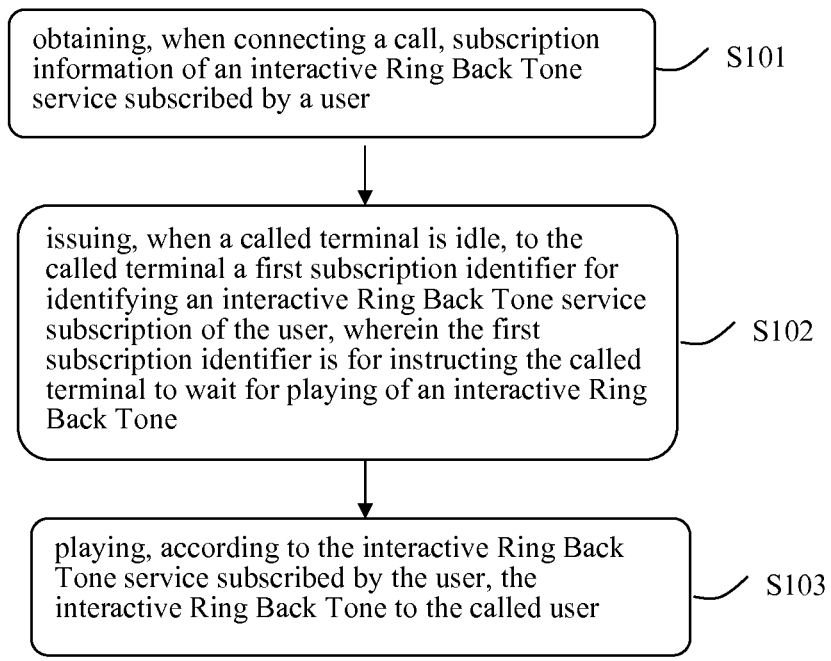
FIG. 1 is a schematic diagram illustrating a flow of a method according to an embodiment of the invention.

A flow of the method for implementing an interactive Ring Back Tone service according to an embodiment of the invention as illustrated in FIG. 1 includes the following steps.

Step S101: obtaining, when connecting a call, subscription information of an interactive Ring Back Tone service subscribed by a user.

Step S102: issuing, when a called terminal is idle, to the called terminal a first subscription identifier for identifying an interactive Ring Back Tone service subscription of the user, wherein the first subscription identifier is for instructing the called terminal to wait for playing of an interactive Ring Back Tone.

Step S103: playing, according to the subscription information of the interactive Ring Back Tone service subscribed by the user, the interactive Ring Back Tone to the called user.

Figure 2:
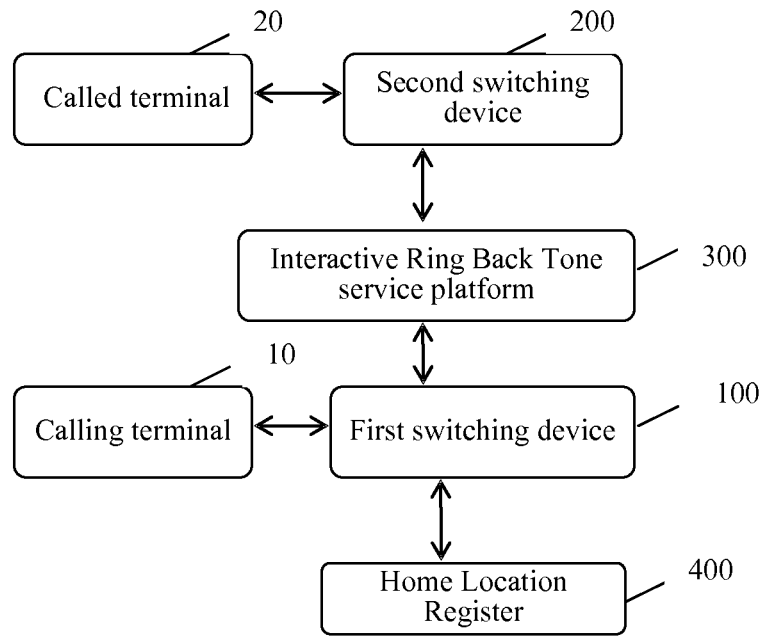
FIG. 2 is a schematic diagram illustrating a networking structure of a system according to a first embodiment of the invention.

The above embodiment of the method is further described in detail below with reference to an embodiment of the system as illustrated in FIG. 2.

The system in FIG. 2 includes a first switching device 100, a second switching device 200, an interactive Ring Back Tone service platform 300, a calling terminal 10 and a called terminal 20. A specific implementing process of an interactive Ring Back Tone service is as follows: the first switching device 100 receives a call request initiated from a caller to a callee, the first switching device 100 obtains subscription information of the interactive Ring Back Tone service of the user, and the first switching device 100 transmits the call request to the second switching device 200 and issues to the second switching device 200 a second subscription identifier for identifying an interactive Ring Back Tone service subscription of the user according to the subscription information of the interactive Ring Back Tone service. When the called terminal 20 is idle, the second switching device 200 issues to the called terminal 20 a first subscription identifier for identifying an interactive Ring Back Tone service subscription of the user, where the first subscription identifier is for instructing the called terminal 20 to wait for playing of the interactive Ring Back Tone. The first switching device 100 issues the second subscription identifier to the interactive Ring Back Tone service platform 300 according to a callee idle message returned by the second switching device 200, connects a session between the calling terminal 10 and the interactive Ring Back Tone service platform 300 and instructs the interactive Ring Back Tone service platform 300 to play the interactive Ring Back Tone to the calling terminal 10. The second switching device 200 connects a session between the called terminal and the interactive Ring Back Tone service platform 300 and instructs the interactive Ring Back Tone service platform 300 to play the interactive Ring Back Tone to the called terminal 20.

In this embodiment, the second subscription identifier transmitted from the first switching device 100 to the second switching device 200 carries an extended information parameter, i.e., the redirection information parameter to be described below, which identifies triggering of the interactive Ring Back Tone service and instructs the called terminal 20 to shield its own ring tone.

In this embodiment, alternatively, the first switching device 100 transmits the obtained subscription information of the interactive Ring Back Tone service to the interactive Ring Back Tone service platform 300, and the interactive Ring Back Tone service platform 300 issues a second subscription identifier, connects a session with the called terminal and plays an interactive Ring Back Tone to the callee. A specific process is as follows: the first switching device 100 obtains and routes the subscription information of the interactive Ring Back Tone service of the user to the interactive Ring Back Tone service platform 300; and the interactive Ring Back Tone service platform 300 issues the second subscription identifier to the second switching device 200 according to the subscription information of the interactive Ring Back Tone service. When the called terminal 20 is idle, the second switching device 200 issues to the called terminal 20 a first subscription identifier for identifying an interactive Ring Back Tone service subscription of the user, where the first subscription identifier is for instructing the called terminal 20 to wait for playing of the interactive Ring Back Tone. The interactive Ring Back Tone service platform 300 connects the session with the called terminal 20 according to a callee idle message returned by the second switching device 200 and plays the interactive Ring Back Tone to the called terminal 20.

A Home Location Register (HLR) 400 may be further included in this embodiment of the system. Particularly, the first switching device 100 is adapted to receive the call request and obtain the subscription information of the user from the HLR; to transmit, upon determination from the subscription information of the user that the calling or the called user subscribes for the interactive Ring Back Tone service, a call request message carrying the identifier for triggering the interactive Ring Back Tone service, i.e., the second subscription identifier, to the second switching device 200 to request for establishing the session between the caller and the callee; and to transmit to the interactive Ring Back Tone service platform 300 the identifier for triggering the interactive Ring Back Tone service when the second switching device 200 returns a callee idle message, where the service identifier may include a Ring Back Tone service access code, and the interactive Ring Back Tone service platform 300 plays to the called user the interactive Ring Back Tone where the interactive Ring Back Tone can be set by the user.

The embodiment of the invention may be applicable to both a case where either the calling or the called user subscribes for the interactive Ring Back Tone service and to a case where both the calling and the called user subscribe for the interactive Ring Back Tone service. In the latter case, a Ring Back Tone to be played to the called user may be determined by priorities set by the users.

With the embodiment, it is possible to make full use of the resources of personalized Ring Back Tones by playing to the callee an interactive Ring Back Tone which is a Ring Back Tone to be played as determined by a setting of the callee; the called user may set different interactive Ring Back Tones for different calling numbers, and the called user may determine the calling users according to the different interactive Ring Back Tones; and the interactive Ring Back Tone may also be set by the calling user, such as a ring tone which embodies personalized information and acts as to notify the called user about the personalized information of the calling user. When the caller and the callee both customize the interactive Ring Back Tone service, a Ring Back Tone to be played to the called user may be determined by priority information set by the called user.

Figure 3:
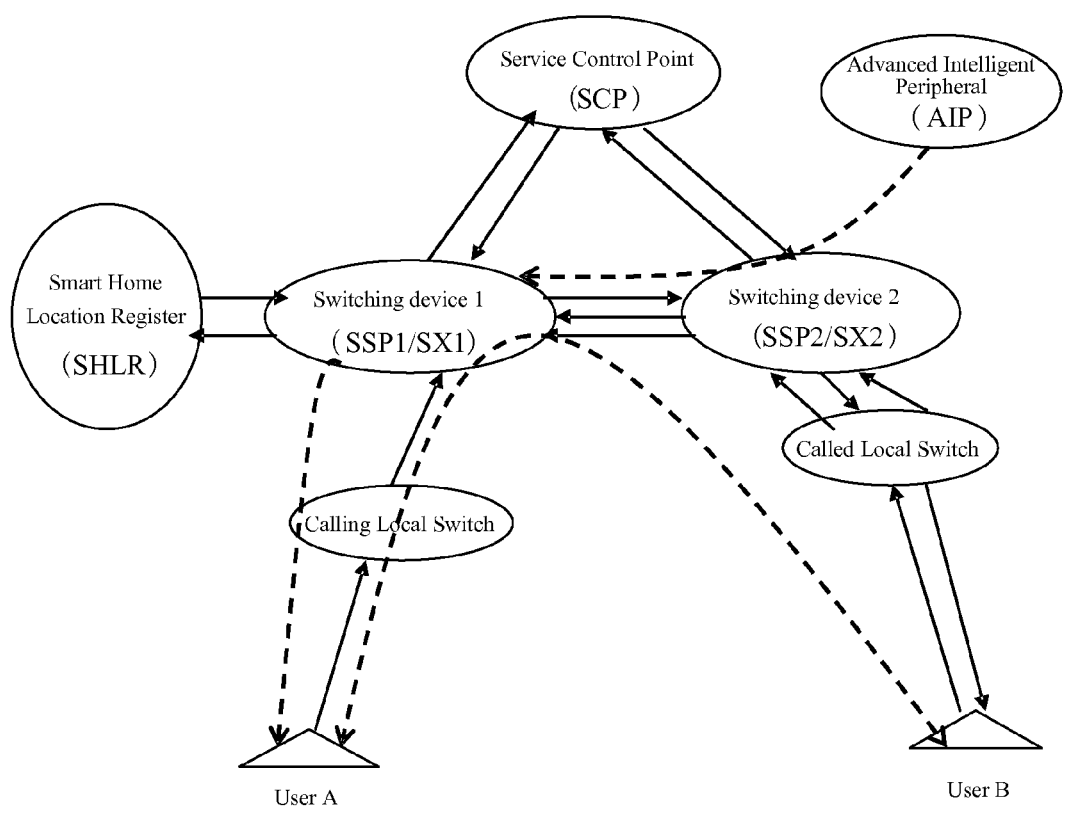
FIG. 3 is a schematic diagram illustrating a networking structure of a system according to an embodiment of the invention implemented in a fixed network.

FIG. 3 is a schematic diagram illustrating a networking of the system according to a first embodiment of the invention implemented in a fixed network, and the system includes a calling end office, a called end office, a Tandem Switch/Service Switching Point (TM/SSP), i.e., the switching device 1 and the switching device 2 in the figure, a Smart Home Location Register (SHLR), a Service Control Point (SCP) and an Advanced Intelligent Peripheral (AIP), where the SHLR stores user subscription information and implements a Ring Back Tone service logic, and the AIP may call a switching device and play a Ring Back Tone to the user.

In this embodiment, the interactive Ring Back Tone service platform may be an AIP or a Ring Back Tone (RBT) platform, the calling and the called end office may connect a call, establish a session between the AIP and the called user upon determination that the calling or the called user subscribes for the interactive Ring Back Tone service thus to play an interactive Ring Back Tone. In this embodiment, alternatively, the AIP may be used to connect the session between the caller and the callee to play a Ring Back Tone, stop playing the Ring Back Tone when the callee responds, and connect the communication session between the caller and the callee to enable communication there between. The embodiment of the invention may be applicable in various networks, e.g., a Public Switched Telephone Network (PSTN), a Personal Handphone System (PHS), a Public Land Mobile Network (PLMN), a Next Generation Network (NGN), The Third Generation (3G) Mobile Telecommunication Network, etc.

Figure 4:
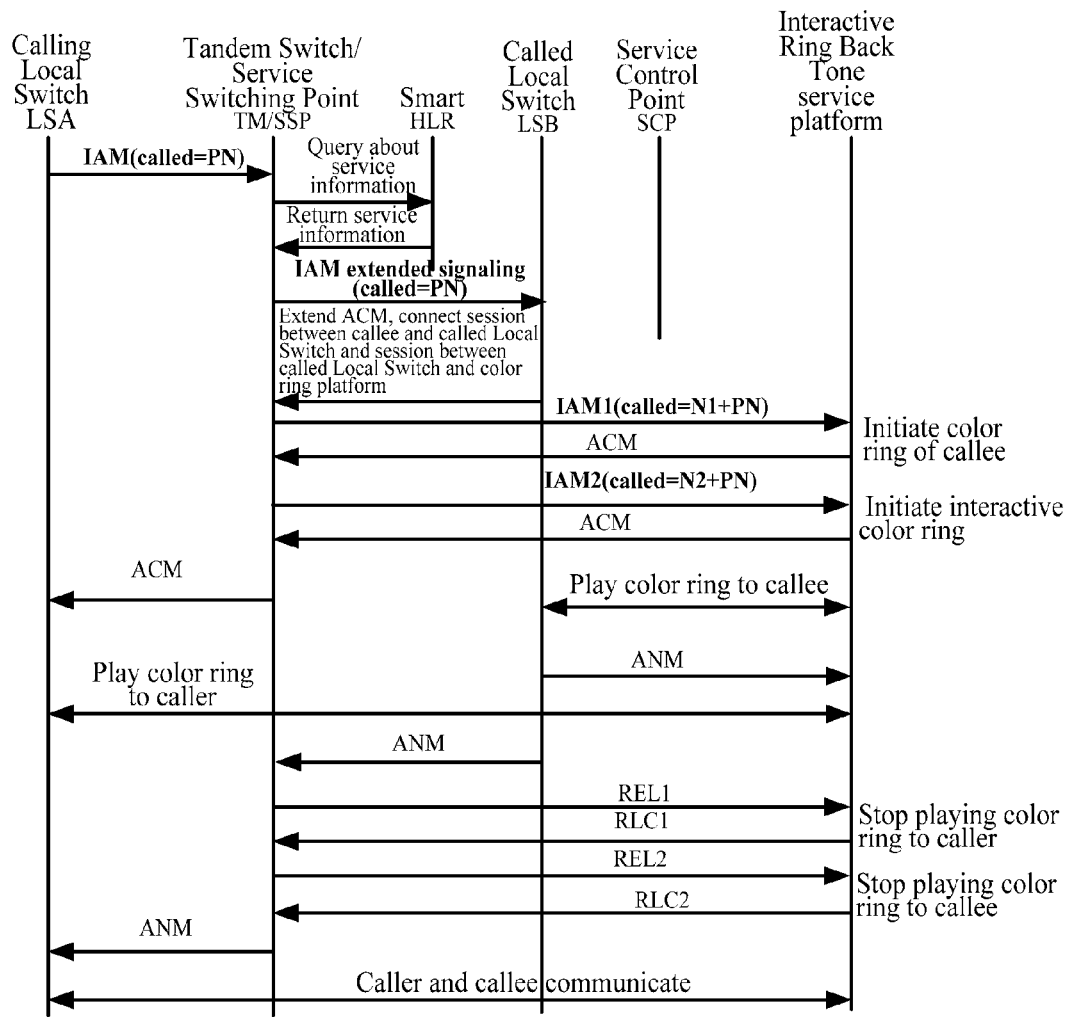
FIG. 4 is a schematic diagram illustrating a signaling flow of a method according to a first embodiment of the invention implemented in a fixed network.

A process for playing an interactive Ring Back Tone to the called user according to the invention is described below with reference to the schematic diagram illustrating the signaling flow of the method according to the first embodiment of the invention implemented in a fixed network as illustrated in FIG. 4.

In this embodiment, the called user is a user that customizes both a Ring Back Tone service and an interactive Ring Back Tone service, and a process for connecting a call as illustrated in FIG. 4 includes the following.

The calling user calls the called user, and the calling end office transmits an Initial Address Message (IAM) and connects the call to the Tandem Switch.

The Tandem Switch queries the Smart Home Location Register about service information, e.g., information of the called user, and the Smart Home Location Register returns to the Tandem Switch a Ring Back Tone service access code 1 if the called user subscribes for the Ring Back Tone service and also an interactive Ring Back Tone service access code 2 if the called user also subscribes for the interactive Ring Back Tone service;

The Tandem Switch determines that the called user is an interactive Ring Back Tone service subscriber according to the received information and then extends a parameter in an IAM message and transmits the extended IAM message to the called end office, and the called end office supports the called user to receive a personalized Ring Back Tone, instead of a conventional ring tone, played from the interactive Ring Back Tone service platform.

In this embodiment, an IAM message may be extended in numerous ways. For example, the redirection information parameter field in an IAM message may be modified to identify triggering of the interactive Ring Back Tone service. The redirection information parameter field is as illustrated in Table 1:

TABLE 1

| 8 | 7 | 6 | 5 | 4 | 3 | 2 | 1 |
|---|---|---|---|---|---|---|---|
| H | G | F | E | D | C | B | A |
| P | O | N | M | L | K | J | I |

Particularly, a format of the redirection information parameter field as defined in "National No. 7 Signaling Technical Specification of the P.R.C, ISDN User Part (ISUP)" is as follows:

Bits of CBA: Redirection indicator

| |
|---|
| 000 No redirection |
| 001 Call rerouted |
| 010 Call rerouted, all redirection information presentation restricted |
| 011 Call forwarded |
| 100 Call forwarded, all redirection information presentation restricted |
| 101 Call rerouted, redirection number presentation restricted |
| 110 Call forwarded, redirection number presentation restricted |
| 111 Reserved |

Bit of D: Reserved
Bits of HGFE: Original redirection reason

| |
|---|
| 0000 Unknown/Not available |
| 0001 User busy |
| 0010 No reply |

In this embodiment, the bit D in the redirection information parameter field can be defined to decide whether to trigger the interactive Ring Back Tone service. For example, if the value of the bit D is 0, it is indicated that the interactive Ring Back Tone service is not to be triggered and a ring tone is to be played to the called user, and if the value of the bit D is 1, it is indicated that the interactive Ring Back Tone service is to be triggered and a personalized Ring Back Tone to the called user, instead of the ring tone, is to be played.

The Tandem Switch extends the redirection parameter according to the interactive Ring Back Tone service subscribed by the called user, and the Tandem Switch sends an IAM message carrying the extended redirection information parameter to the called end office to request the called end office for establishing a session of the current call, and the redirection information parameter may be used to identify triggering of the interactive Ring Back Tone service.

Upon reception of the IAM message transmitted from the Tandem Switch, the called end office determines from the IAM message that the redirection information parameter carried in the message indicates triggering of the interactive Ring Back Tone service. The called end office addresses the called user, and when the called user is busy, the called end office returns to the Tandem Switch an ACM message indicating that the callee is busy; and if the callee is idle, a session between the called end office and the called user is connected, the subscription identifier for identifying an interactive Ring Back Tone service subscription of the user, i.e., the second subscription identifier, is issued to the called user to instruct the called terminal to shield its own ring tone and to wait for playing of the interactive Ring Back Tone, and an ACM information indicating that the callee is idle is returned to the Tandem Switch. In this step, if the called end office determines no interactive Ring Back Tone service is subscribed by the called user, it proceeds with a normal processing flow of instructing the callee to ring and returns to the Tandem Switch an ACM message indicating that the callee is idle or busy.

According to the status of the called user returned from the called end office, the Tandem Switch transports transparently the Ring Back Tone played from the called end office to the called user if the callee is busy and transmits two IAM messages to the interactive Ring Back Tone service platform if the callee is idle, the first IAM message carries the called Ring Back Tone service access code 1 and the second IAM message carries the interactive Ring Back Tone service access code 2, to trigger the Ring Back Tone service to play a Ring Back Tone to the caller and the interactive Ring Back Tone service to play a Ring Back Tone to the callee, respectively.

Upon reception of the call request from the Tandem Switch, the interactive Ring Back Tone service platform determines from the access code 1 and the access code 2 that the callee Ring Back Tone service and the interactive Ring Back Tone service shall be triggered, and then determines the ring tones to be played according to the calling number, or the calling and the called number, or the calling and the called number and a current time, and returns an ACM message to the Tandem Switch.

The Tandem Switch bridges sessions with the calling and the called user respectively to enable playing of the Ring Back Tones.

The interactive Ring Back Tone service platform plays the Ring Back Tone to the calling user and the Ring Back Tone of the interactive Ring Back Tone service to the callee respectively through the two sessions. The service for playing the interactive Ring Back Tone to the callee may be dependent upon a setting of the called user, which may be the same as or different from the Ring Back Tone to be played to the caller.

After the Tandem Switch detects hooking-off of the called user, the Tandem Switch initiates two Release (REL) messages to the interactive Ring Back Tone service platform to request the interactive Ring Back Tone service platform for stopping playing the Ring Back Tones to the calling and the called user, and after the Tandem Switch receives a Release Complete (RLC) message returned from the interactive Ring Back Tone service platform, the Tandem Switch connects the session between the caller and the callee, and the caller and the callee communicate normally.

In the above embodiment, if the calling user is a Ring Back Tone service user, the called interactive Ring Back Tone service user may also be enabled to hear a Ring Back Tone customized by the caller, or the called user may set flexibly the playing of an interactive Ring Back Tone, for example, by correspondingly setting different Ring Back Tones for different calling users. In an embodiment of the invention, the calling user may also customize the interactive Ring Back Tone service for the called user. For example, the calling user may customize a personalized Ring Back Tone to indicate the identity of the calling user, thereby prompting the called user to answer, and the Ring Back Tone may be played to the called user when the calling user calls the callee.

Figure 5:
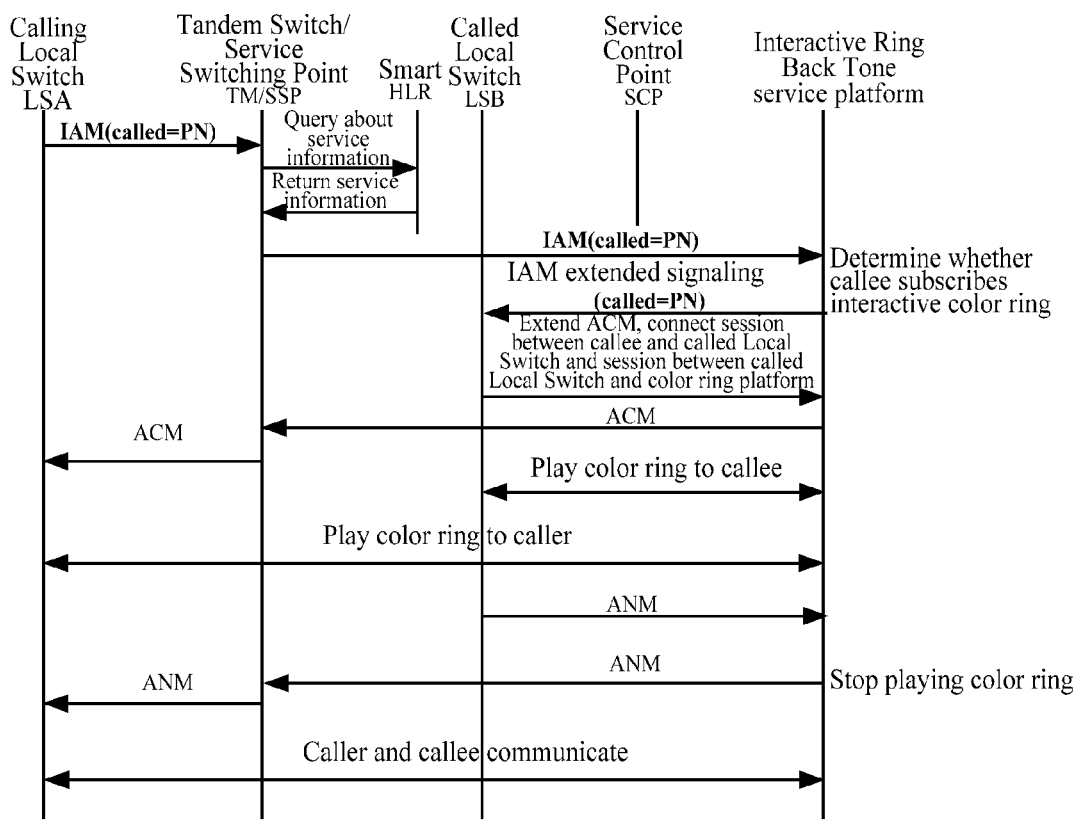
FIG. 5 is a schematic diagram illustrating a signaling flow of a method according to a second embodiment of the invention implemented in a fixed network.

FIG. 5 illustrates a signaling flow diagram of the method according to the second embodiment of the invention implemented in a fixed network, and an implementation of this embodiment of the method is described also by way of an example where the callee subscribes for an interactive Ring Back Tone service. In this embodiment, a session between the caller and the callee is connected through the interactive Ring Back Tone service platform to enable playing of a Ring Back Tone.

The calling terminal user calls the called terminal user, and the calling end office transmits an IAM message and connects the call to the Tandem Switch.

The Tandem Switch queries the Smart Home Location Register about service information, e.g., information of the called user, and the Smart Home Location Register returns to the Tandem Switch a Ring Back Tone service access code. The Tandem Switch determines that the called user subscribes for the Ring Back Tone service according to the received service information, inserts the Ring Back Tone service access code as a prefix of the called number, and routes the call to the interactive Ring Back Tone service platform.

Upon reception of the call, the interactive Ring Back Tone service platform determines that the called user subscribes for the interactive Ring Back Tone service, and then initiates the call to the called user by transmitting to the called end office an IAM message with a parameter being extended to indicate that a session shall be established for the current call. That is, the IAM message is extended to support the called user to receive a personalized Ring Back Tone, instead of a conventional ring tone, played from the interactive Ring Back Tone service platform. Particularly, a way to extend an IAM message may be the same as that described in the above embodiment by modifying the redirection information parameter field in the message, and repeated descriptions thereof is omitted.

Upon reception of the call request from the interactive Ring Back Tone service platform, the called end office determines whether the call request carries the second subscription identifier and proceeds with a normal processing flow if the second subscription identifier is not carried. If the callee is idle, the callee is instructed to ring and an ACM message indicating that the callee is idle is returned to the interactive Ring Back Tone service platform, and the interactive Ring Back Tone service platform further returns an ACM message to the calling end office, the session from the interactive Ring Back Tone service platform to the calling end office is connected, and the Ring Back Tone is played to the calling user. If the callee is busy, an ACM message indicating the busy status of the callee is returned to the calling end office. If the call request received by the called end office carries the second subscription identifier, it indicates that the interactive Ring Back Tone service shall be triggered. In this case, the called end office determines the status of the called user; and if the called user is busy, an ACM message indicating that the called party is busy is returned to the calling end office, and if the called user is idle, the session from the called end office to the called user is connected, the called user is instructed to wait for playing of the interactive Ring Back Tone, and an ACM message indicating that the callee is idle is returned to the interactive Ring Back Tone service platform.

Upon reception of the ACM message indicating idleness of the callee returned from the called end office, the interactive Ring Back Tone service platform returns an ACM message to the calling end office, the two sessions from the interactive Ring Back Tone service platform to the calling and the called end office are connected respectively, and the same or different Ring Back Tones are played to the calling and the called user through the sessions.

After the called user hooks off and answers, the called end office transmits an Answer Message (ANM) to the interactive Ring Back Tone service platform, the interactive Ring Back Tone service platform stops playing the tone and connects the session between the caller and the callee, and the caller and the callee communicate normally.

In this embodiment, both the call with the personalized Ring Back Tone and the call with the interactive Ring Back Tone may be called out by the Ring Back Tone platform, and the flow of triggering the personalized Ring Back Tone service may be implemented for a user who subscribes for no interactive color ring as in the original solution where the SSP is responsible for bridging the session, but this requires that a color ring service shall be distinguished from an interactive color ring when making a subscription of the service at the SHLR. The SSP queries the SHLR about the service subscription information and proceeds with the original detour-free solution if the callee subscribes for the color ring service, and forwards the call to a color ring platform which is responsible for processing the call if the callee subscribes for the interactive color ring service.

Figure 6:
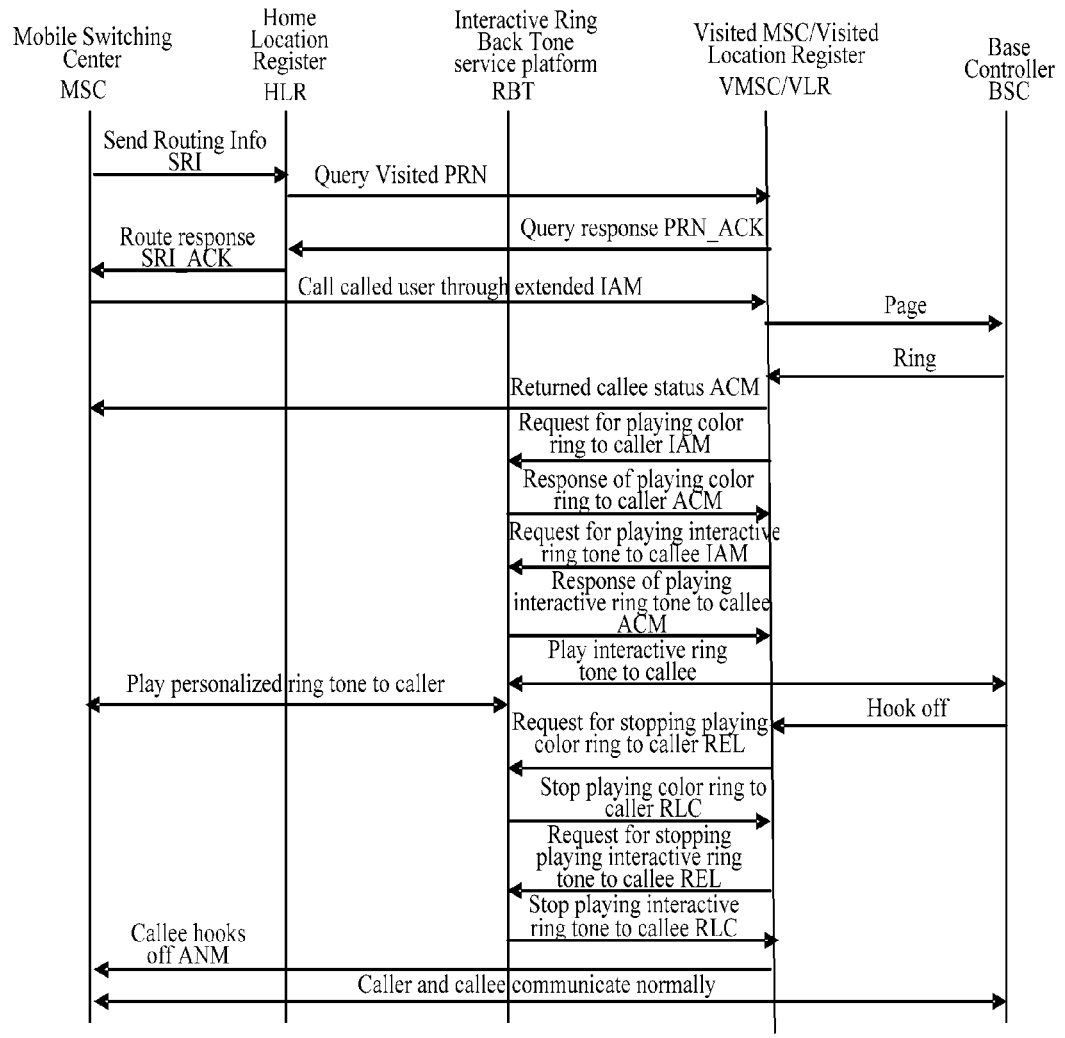
FIG. 6 is a schematic diagram illustrating a signaling flow of a method according to an embodiment of the invention implemented in a mobile network.

FIG. 6 is a schematic diagram illustrating a flow for implementing an interactive Ring Back Tone service in a mobile network according to an embodiment of the invention, and the flow for implementing an interactive Ring Back Tone service in a mobile network is described with reference to FIG. 6 and with the assumption that the called user customizes an interactive Ring Back Tone service.

The calling user calls the called user, a Mobile Switching Center (MSC) transmits a Send Routing Info (SRI) message to the Home Location Register to obtain subscription information of the called user, and the HLR obtains the subscription information of the user from a Visited Location Register (VLR) and connects the call to a Visited Mobile Switching Center (Visited MSC/Visited HLR or VMSC/VHLR).

By a TICK identifier in a message returned to the HLR, the VLR identifies whether the called user subscribes for the Ring Back Tone service and/or the interactive Ring Back Tone service.

The MSC initiates a corresponding processing flow of the interactive Ring Back Tone service according to the TICK identifier carried in the received subscription information of the user returned from the HLR.

If the user subscribes for only the Ring Back Tone service but not for the interactive Ring Back Tone service, the MSC calls the VMSC through a standard IAM message, and if the user subscribes for both the Ring Back Tone service and the interactive Ring Back Tone service, the MSC calls the VMSC through an extended IAM message.

The VMSC receives the call request from the MSC and determines whether it is a standard or extended IAM message. In the case of a standard IAM message, the VMSC pages the callee through a standard PAGING message, and in the case of an extended IAM message, the VMSC pages the callee through an extended PAGING message.

The called user receives the paging request from the VMLS and determines whether it is a standard or extended PAGING message. In the case of a standard PAGING message, the called user rings normally and returns a ring message ALERTING to the VMSC, and in the case of a PAGING message extended by extending contents of the TMSI field therein to identify triggering of the interactive Ring Back Tone service, the called terminal does not ring or shields ringing and waits for playing of a personalized Ring Back Tone from the interactive Ring Back Tone service platform and at the same time returns an ALERTING message to the VMSC.

After paging the callee successfully, the VMSC transmits an ACM message to the MSC and does not play a standard Ring Back Tone of the Global System for Mobile Communications (GSM) but transmits a first standard Initial Address Message IAM1 to the interactive Ring Back Tone service platform to play a Ring Back Tone to the caller. If the called user also subscribes for the interactive Ring Back Tone service, the VMSC further transmits a second standard Initial Address Message IAM2 to the interactive Ring Back Tone service platform to play a Ring Back Tone to the callee. The called number parameter is in a form of "Prefix plus MSISDN of a callee", where the Prefix is configurable.

Upon reception of the IAM messages from the VMSC, the interactive Ring Back Tone service platform transmits an ACM message to the VMSC in response, and the interactive Ring Back Tone service platform plays the customized Ring Back Tone to the calling user and the customized interactive Ring Back Tone to the called user according to the calling and the called number.

The Ring Back Tones played to the caller and the callee from the interactive Ring Back Tone service platform may be set by the users and may be the same as or different from each other.

After detecting a response of the callee, the VMSC clears the session connection with the interactive Ring Back Tone service platform, and the VMSC transmits a response message to the MSC in response and connects the session between the caller and the callee, so that the calling and the called user communicate normally.

In this embodiment, alternatively, the calling user may customize an interactive Ring Back Tone for the called user, and a specific implementation process thereof is substantially the same as that described above and is not described again.

Those ordinarily skilled in the art can appreciate that all or part of the steps in the method of the above embodiments can be implemented by a program instructing relevant hardware, which can be stored in a computer readable memory medium, e.g., an ROM/RAM, a magnetic disk, an optical disk, etc.

Figure 7:
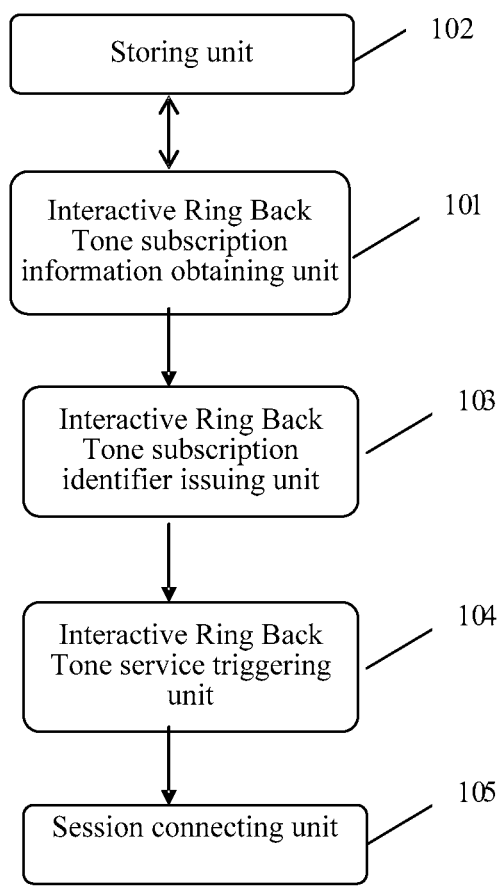
FIG. 7 is a schematic diagram illustrating a structure of a switching device according to an embodiment of the invention.

FIG. 7 is a schematic diagram illustrating a structure of the switching device for implementing an interactive Ring Back Tone service according to an embodiment of the invention, and the switching device includes: an interactive Ring Back Tone subscription information obtaining unit 101 adapted to obtain the subscription information of the interactive Ring Back Tone service subscribed by the user; an interactive Ring Back Tone subscription identifier issuing unit 103 adapted to issue to the called terminal the second subscription identifier, where the second subscription identifier is for instructing the called terminal to wait for playing of the interactive Ring Back Tone; an interactive Ring Back Tone service triggering unit 104 adapted to route the subscription information of the interactive Ring Back Tone service to the interactive Ring Back Tone service platform to trigger the interactive Ring Back Tone service. The switching device may further include a storing unit 102 and a session connecting unit 105. The storing unit 102 is adapted to store the information of the interactive Ring Back Tone service subscribed by the user, and the session connecting unit 105 is adapted to connect the communication session between the interactive Ring Back Tone service platform and the terminal to enable the interactive Ring Back Tone service platform to play an interactive Ring Back Tone to the user.

Figure 8:
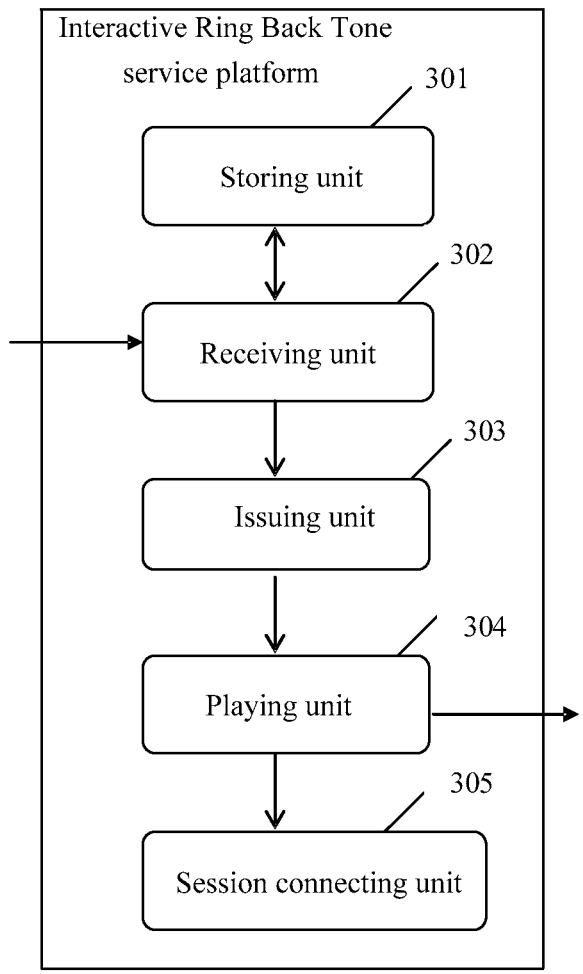
FIG. 8 is a schematic diagram illustrating a structure of an interactive Ring Back Tone service platform according to an embodiment of the invention.

FIG. 8 is a schematic diagram illustrating a structure of the interactive Ring Back Tone service platform according to an embodiment of the invention, and the interactive Ring Back Tone service platform includes a receiving unit 302, a storing unit 301, an issuing unit 303 and a playing unit 304. Particularly, the storing unit 301 is adapted to store service information for customizing the interactive Ring Back Tone service, the receiving unit 302 is adapted to receive the subscription information of the interactive Ring Back Tone service transmitted from the switching device, the playing unit 304 is adapted to play an interactive Ring Back Tone to the user according to the subscription information of the interactive Ring Back Tone service customized by the caller and/or the callee and the service information stored in the storing unit 301; and the issuing unit 303 is adapted to issue to the switching device the second subscription identifier to instruct the called terminal to shield its own ring tone. The second subscription identifier is used to identify an interactive Ring Back Tone service subscription of the user.

The interactive Ring Back Tone service platform may further include a session connecting unit 305 adapted to establish the session with the terminal to enable the interactive Ring Back Tone service platform to play the interactive Ring Back Tone to the user. The session connecting unit 305 connects the session with the called terminal through the switching device.

In this embodiment, the issuing unit 303 issues the second subscription identifier to the second switching device, calls the called terminal through the second switching device, determines the status of the callee according to the message returned from the called terminal, and transports transparently a busy tone to the caller if the callee is busy or triggers the interactive Ring Back Tone service if the callee is idle. After the called user hooks off, the session connection unit 305 may also disconnect the sessions of the interactive Ring Back Tone service platform with the calling and the called terminal and connect the session between the caller and the callee, and the caller and the callee can communicate normally. The session connection unit 305 may initiate a call to the switching device in different outgoing call protocols, e.g., the Telephone User Part (TUP) protocol, the Integrated Services Digital Network User Part (ISUP) protocol, the Intelligent Network Application Protocol (INAP), the Mobile Application Part (MAP) protocol, the CAMEL Application Part (CAP) protocol, the Session Initiation Protocol (SIP), etc.

Figure 9:
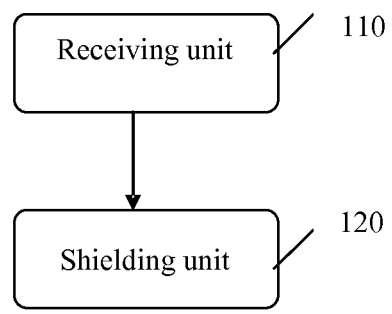
FIG. 9 is a schematic diagram illustrating a structure of a terminal for implementing an interactive Ring Back Tone service according to an embodiment of the invention.

FIG. 9 is a schematic diagram illustrating a structure of the terminal for implementing an interactive Ring Back Tone service according to an embodiment of the invention, which includes: a receiving unit 110 adapted to receive the first subscription identifier for identifying a subscription of the interactive Ring Back Tone service by the user, where the first subscription identifier is for instructing the called terminal to wait for playing of an interactive Ring Back Tone; and a shielding unit 120 adapted to shield its own ring tone according to the first subscription identifier.

With the method and system according to the embodiments of invention, it is possible to make full use of the resources of personalized Ring Back Tones by both playing to the caller a personalized Ring Back Tone and playing to the callee an interactive Ring Back Tone which is a Ring Back Tone to be played as determined by a setting of the callee, and the called user may determine the calling user according to the currently played Ring Back Tone; thereby improving user experience.

As a result, those skilled in the art can modify and devise the invention without departing from the spirit and scope of the invention. Accordingly, the invention is intended to encompass these modifications and variations falling into the scope of the appended claims of the invention and equivalents thereof.

What is claimed is:

1. A method for providing a Ring Back Tone in a communication network, comprising:
 obtaining, when connecting a call, by a first switching device, subscription information of an interactive Ring Back Tone service subscribed by a callee and a caller, and routing, by the first switching device, the subscription information of the interactive Ring Back Tone service to an interactive Ring Back Tone service platform;
 issuing, by the interactive Ring Back Tone service platform, a second subscription identifier to a second switching device according to the subscription information of the interactive Ring Back Tone service, wherein the second subscription identifier identifies the interactive Ring Back Tone service subscription of the callee and the caller;
 issuing, when the callee is idle, by the second switching device, to the callee a first subscription identifier for identifying an interactive Ring Back Tone service subscription of the callee and the caller, wherein the first subscription identifier instructs the callee to wait for playing of an interactive Ring Back Tone;
 determining, by the interactive Ring Back Tone service platform, the interactive Ring Back Tone to be played according to a priority set in the subscription information of the interactive Ring Back Tone service subscribed by the caller and the callee, and playing, by the interactive Ring Back Tone service platform the interactive Ring Back Tone to the callee; and
 wherein,
 the process of obtaining subscription information of an interactive Ring Back Tone service subscribed by the callee and the caller comprises: obtaining, by the first switching device, from a Home Location Register the subscription information of the interactive Ring Back Tone service subscribed by the callee and the caller.

2. The method according to claim 1, further comprising:
 connecting, by the interactive Ring Back Tone service platform, a session with the caller according to a callee idle message returned by the second switching device, and playing the Ring Back Tone to the caller.

3. The method according to claim 1, further comprising:
 connecting, by the interactive Ring Back Tone service platform, a session with the callee according to a callee idle message returned from the second switching device, and playing the interactive Ring Back Tone to the callee.

4. The method according to claim 1, wherein the second subscription identifier comprises a redirection information parameter and is carried in an Initial Address Message.

\* \* \* \* \*